AUSTIN & CREASY.
Hemp Brake.

No. 31,585. Patented March 5, 1861.

UNITED STATES PATENT OFFICE.

WM. W. AUSTIN AND F. CREASY, OF CARROLLTON, MISSOURI.

IMPROVEMENT IN HEMP-BRAKES.

Specification forming part of Letters Patent No. 31,585, dated March 5, 1861.

*To all whom it may concern:*

Be it known that we, W. W. AUSTIN and F. CREASY, of Carrollton, in the county of Carroll and State of Missouri, have invented a new and Improved Machine for Breaking and Preparing Hemp; and we do hereby declare that the following is a full, clear, and exact description thereof, reference being had to the accompanying drawings, making part of this specification, in which—

Figure 1:
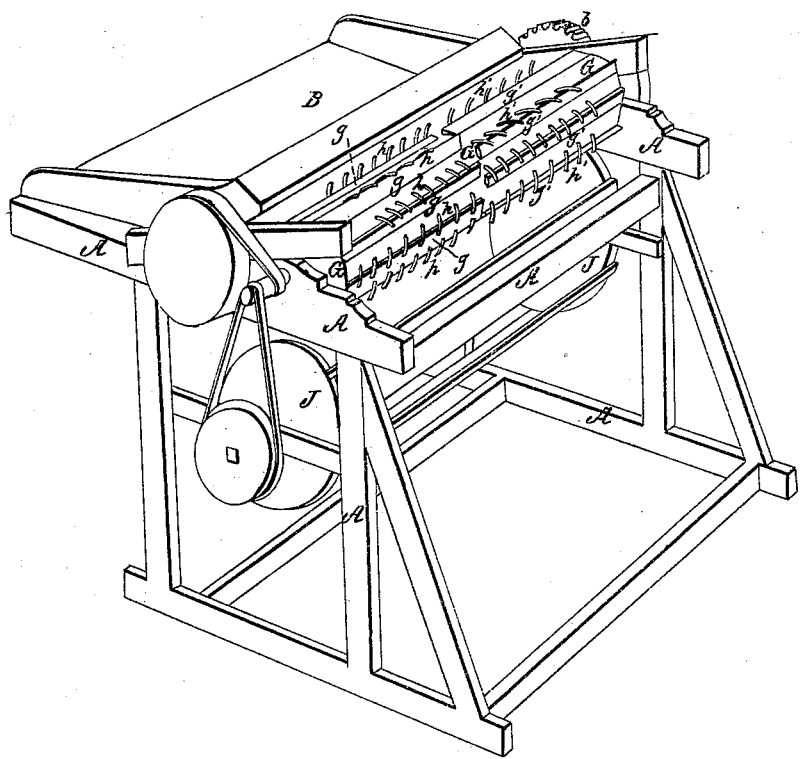
Figure 2:
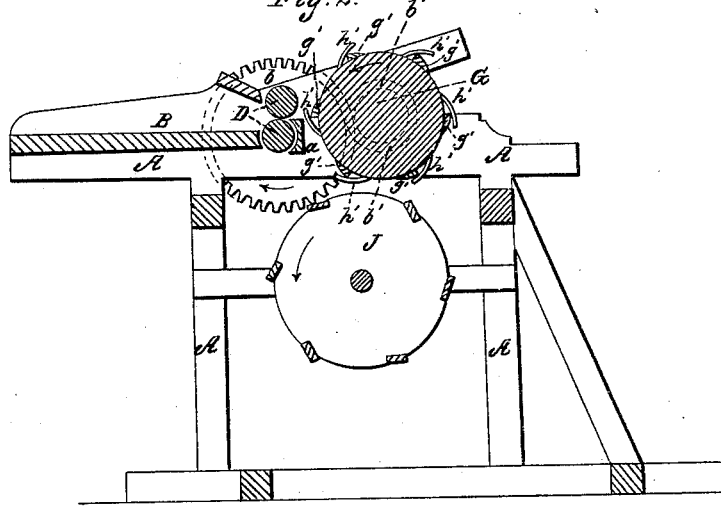

Figure 1 represents a perspective view of the improved machine for breaking hemp. Fig. 2 is a vertical longitudinal section taken through the middle of the hemp-brake.

Similar letters of reference indicate corresponding parts in both figures.

To enable those skilled in the art to fully understand our invention, we will proceed to describe its construction and operation.

The machine in which the improved breaking-cylinder is used consists of a frame-work, A, and feeding-box B, at the mouth of which are placed two feed-rollers, D D, and a breaking-strip, $a$. Said rollers are driven by cogged wheels $b\ b$, which receive their motion from the shaft of the breaking-cylinder G. Underneath the breaking-cylinder is placed a rotary slotted beater, J, for cleaning the broken hemp after it leaves the cylinder G. The parts all move in the direction indicated by the arrows, Fig. 2. The cylinder G has its bearings in each side of the frame A, and it is placed immediately in front of the feed-rollers D D. This cylinder has arranged on its surface in a novel manner breaking-slats $g\ g$, and swords or short splitters $h\ h$. The slats are each half as long as the cylinder, and are placed at regular intervals apart, extending along parallel with the axis of the cylinder. The slats of one end of the cylinder are placed opposite to the spaces between the slats of the other end of the cylinder, so that in operating the machine but half of the cylinder or slats will touch the hemp at one time, and thus the slats will operate alternately, first one end then the other acting upon the stalks as they are fed from the rollers D D.

The swords that assist in preparing the stalks for the cleaning-slats are arranged over the slats $g\ g$ longitudinally with the axis of the cylinder G, and they are arranged on each slat in rows at regular distances apart, the swords on one slat being opposite to the spaces between the swords on the other slats. The short swords and slats being thus combined and arranged upon cylinder G, and made to operate upon the stalks in the manner before described, the slats break the stalks transversely, and the swords at the same time split them longitudinally, or in a direction with the fibers, which operations combined crack the woody matter and partially separate the long fibers. The swords have a twofold effect, as they are intended to extend from one to one and a half inch in advance of the breaking-slats. They first mash the end of the hemp and peel off the lint before the stalk reaches it, leaving it bare of lint, and as a consequence the fiber is much less injured in the process of breaking. After it is broken, the swords follow each other in succession and, before the hemp advances out of reach of them, combs and cleans the hemp and delivers it perfectly straight from the brake. The peculiar manner in which the swords slope or curve back causes them to run entirely through the hemp without tangling or breaking the lint.

Our improvement may be used for breaking hemp that is much watered.

Having thus described our invention, what we claim as new, and desire to secure by Letters Patent, is—

The above-mentioned arrangement of the swords or splitters $h\ h$ and breaking-slats $g\ g$ upon the cylinder G, for the purposes shown and described.

WM. W. AUSTIN.
FLEMING CREASY.

Witnesses:
CALVIN THOMPSON,
GEO. L. MOORMAN.